No. 794,920. PATENTED JULY 18, 1905.
D. C. BLANCHARD.
GASKET.
APPLICATION FILED AUG. 24, 1904.

Witnesses:
Raphaël Netter
H. Richard Wöbse

Don C. Blanchard Inventor
by Baxter Morton Asso. Att'y.

No. 794,920.

Patented July 18, 1905.

UNITED STATES PATENT OFFICE.

DON C. BLANCHARD, OF CHICAGO, ILLINOIS.

GASKET.

SPECIFICATION forming part of Letters Patent No. 794,920, dated July 18, 1905.

Application filed August 24, 1904. Serial No. 222,027.

*To all whom it may concern:*

Be it known that I, DON C. BLANCHARD, a citizen of the United States, residing at 872 Washington Boulevard, in the city of Chicago, county of Cook, and State of Illinois, have invented certain new and useful Improvements in Gaskets, of which the following is a specification.

This invention relates to gaskets; and it has for its principal object the provision of an improved gasket consisting of a plastic material and strengthening devices embedded therein, which is adapted to give satisfactory service in withstanding very high pressures, as of steam or other fluids.

A further object of the invention is to provide a simple method or process by which gaskets adapted to withstand high pressures may be manufactured at a low cost.

A gasket constructed in accord with the present invention is hereinafter fully described and the method of making the gasket is explained in detail, reference being had to the accompanying drawings, in which I have illustrated the construction of a finished gasket and the mode of making it.

Figure 1:
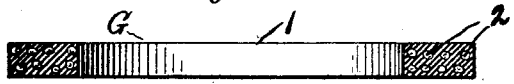
Figure 2:
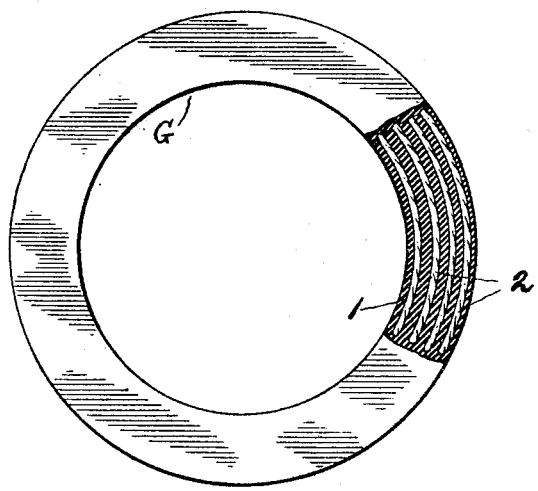
Figure 3:
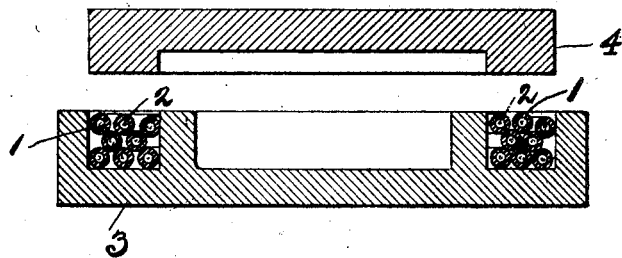
Figure 4:

In the drawings, Figure 1 is a transverse sectional view through a finished gasket. Fig. 2 is a top plan view of a gasket with a portion of the plastic material removed to show the strengthening-cords embedded therein. Fig. 3 is a transverse sectional view through a mold for the formation of a gasket, showing a coil of insulated cord disposed within the mold-cavity. Fig. 4 is a perspective view of a coil of insulated cord ready for introduction into the mold.

Referring to the drawings, and more especially to Figs. 1 and 2 thereof, G designates a gasket which consists of a body 1 of rubber or other suitable plastic material having embedded therein a strengthening structure which consists, preferably, of one or more coils of fibrous material 2, such as cord. In the gasket illustrated the cord is formed in a coil presenting a plurality of whirls or turns at different distances from the center of the gasket and so serving to reinforce each other. In thin gaskets all the whirls or turns of the cord may lie in substantially the same plane, and in gaskets of greater thickness they may be arranged in two or more planes, according to the thickness.

The method of making the improved gasket which is followed in order to obtain the desired arrangement of the cord in whirls or turns at different distances from the center of the gasket is illustrated in Figs. 3 and 4. The cord is first coated or insulated with rubber or other plastic material which is to form the body of the gasket, and this insulation of the cord may be accomplished in any suitable manner. The insulated cord is then wound in coils of proper diameter, as illustrated in Fig. 4, the diameter of the coil being determined by the diameter of the gasket to be produced. For each gasket one or more cords may be wound into coils, as desired, the number of cords used and the number of whirls or turns formed being determined by the size of the gasket and the conditions it is designed to meet. The coil or coils of insulated cord for the formation of the gasket are then laid in the cavity of the mold 3, (diagrammatically illustrated in Fig. 3,) and the top 4 of the mold is then placed in position and the coil or coils of insulated cord in the mold-cavity subjected to heat and pressure for a sufficient length of time to unite the several whirls or turns of the insulated cord into a single unitary structure, as shown in Figs. 1 and 2. The gasket is then removed from the mold and cured, or the curing may be effected in the mold.

The coating of the cord 2 with the plastic material which serves to form the body of the gasket may be accomplished either by hand or by any suitable apparatus, and the coiling may also be done in any preferred manner, these steps forming no part of the present invention, but being merely preliminary thereto. In practice it is desirable that both the coating of the cord and the formation of the coils be done automatically and in a single operation by machinery designed for that purpose.

The present invention relates merely to the gasket and the method of forming it out of the previously coated or insulated cord or other strengthening material.

Having thus described my invention, what I claim as new is—

1. A gasket of plastic material having embedded therein a strengthening structure consisting of one or more circumferentially-disposed strands of fibrous material, each forming one or more complete whirls or turns.

2. A gasket of plastic material having embedded therein a strengthening structure consisting of one or more circumferentially-disposed strands of fibrous material, each formed into a plurality of whirls lying at different distances from the center.

3. A gasket consisting of one or more coils of cord coated with a plastic material and united into a unitary structure.

4. A gasket consisting of a body of plastic material and an embedded strengthening structure, the strengthening structure comprising one or more strands of fibrous material, each strand being formed into a substantially flat spiral, with its whirls or turns lying at different distances from the center of the gasket.

In witness whereof I have hereunto set my hand in the presence of two witnesses.

DON C. BLANCHARD.

Witnesses:
E. B. HALLADAY,
J. E. SPENCER.